United States Patent
Weh et al.

(10) Patent No.: US 12,162,445 B2
(45) Date of Patent: Dec. 10, 2024

(54) HYDRAULIC UNIT FOR A SERVICE BRAKE ASSEMBLY OF A HYDRAULIC POWER-BRAKE SYSTEM

(71) Applicant: Robert Bosch GmbH, Stuttgart (DE)

(72) Inventors: Andreas Weh, Sulzberg (DE); Juergen Tandler, Fuessen (DE); Matthias Mayr, Rettenberg (DE); Stefan Kaserer, Ofterschwang (DE)

(73) Assignee: ROBERT BOSCH GMBH, Stuttgart (DE)

( * ) Notice: Subject to any disclaimer, the term of this patent is extended or adjusted under 35 U.S.C. 154(b) by 378 days.

(21) Appl. No.: 17/652,508

(22) Filed: Feb. 25, 2022

(65) Prior Publication Data

US 2022/0348176 A1 Nov. 3, 2022

(30) Foreign Application Priority Data

Apr. 28, 2021 (DE) ................. 10 2021 204 255.4

(51) Int. Cl.
*B60T 8/36* (2006.01)
*B60T 13/14* (2006.01)
*B60T 17/04* (2006.01)

(52) U.S. Cl.
CPC ............ *B60T 13/142* (2013.01); *B60T 17/04* (2013.01)

(58) Field of Classification Search
CPC ...... B60T 8/368; B60T 13/168; B60T 13/142; B60T 17/04
See application file for complete search history.

(56) References Cited

U.S. PATENT DOCUMENTS

| | | | | |
|---|---|---|---|---|
| 2014/0216866 | A1* | 8/2014 | Feigel | B60T 17/00 188/156 |
| 2015/0166028 | A1* | 6/2015 | Kim | B60T 8/4081 303/10 |
| 2015/0298675 | A1* | 10/2015 | Mayr | B60T 8/368 92/169.1 |
| 2017/0021813 | A1* | 1/2017 | Tandler | B60T 8/368 |
| 2019/0016321 | A1* | 1/2019 | Dinkel | B60T 8/4081 |
| 2019/0031164 | A1* | 1/2019 | Tandler | B60T 8/368 |
| 2020/0031327 | A1* | 1/2020 | Mayr | F16H 57/0435 |
| 2020/0047731 | A1* | 2/2020 | Reuter | B60T 13/146 |
| 2020/0282968 | A1* | 9/2020 | Mayr | B60T 7/042 |
| 2020/0391712 | A1* | 12/2020 | Mallmann | B60T 8/368 |
| 2021/0221345 | A1* | 7/2021 | Maruo | B60T 7/042 |
| 2021/0309197 | A1* | 10/2021 | Weh | B60T 8/368 |
| 2022/0112888 | A1* | 4/2022 | Weh | B60T 13/745 |
| 2022/0274574 | A1* | 9/2022 | Bareiss | B60T 8/3685 |
| 2022/0274578 | A1* | 9/2022 | Weh | B60T 13/745 |
| 2023/0256953 | A1* | 8/2023 | Weh | F15B 15/02 137/597 |
| 2024/0116485 | A1* | 4/2024 | Weh | B60T 13/745 |

FOREIGN PATENT DOCUMENTS

| | | |
|---|---|---|
| DE | 102016202113 A1 | 8/2017 |
| WO | 2012143312 A1 | 10/2012 |

* cited by examiner

*Primary Examiner* — Bradley T King
(74) *Attorney, Agent, or Firm* — NORTON ROSE FULBRIGHT US LLP; Gerard A. Messina (57) ABSTRACT

A drilling of a hydraulic unit of a service brake assembly of a vehicle hydraulic-power brake system.

6 Claims, 6 Drawing Sheets

HYDRAULIC UNIT FOR A SERVICE BRAKE ASSEMBLY OF A HYDRAULIC POWER-BRAKE SYSTEM

CROSS REFERENCE

The present application claims the benefit under 35 U.S.C. § 119 of German Patent Application No. DE 10 2021 204 255.4 filed on Apr. 28, 2021, which is expressly incorporated herein by reference in its entirety.

FIELD

The present invention relates to a hydraulic unit for a service brake assembly of a hydraulic power-brake system for an autonomously driving motor vehicle.

BACKGROUND INFORMATION

For autonomous driving up to level 4 (driver may be requested to intervene) and level 5 (highest level; no driver required), a power-brake system is necessary having redundancies which preclude a total failure of the vehicle brake system with a probability bordering on certainty, without the need for input by a driver.

PCT Published Application No. WO 2012/143 312 A1 describes an electrohydraulic power-brake system for a motor vehicle having a service brake assembly and having a brake-pressure control assembly. The service brake assembly has a brake master cylinder, operable by muscular energy, and a piston-cylinder unit, whose piston is displaceable in a cylinder by an electric motor via a screw drive, as power brake-pressure generator which is connected hydraulically in parallel to the brake master cylinder. The brake-pressure control assembly has solenoid valves and a hydraulic pump in each brake circuit to control the wheel-brake pressure individually for each wheel. The brake-pressure control assembly is connected to the service brake assembly and hydraulic wheel brakes are connected to the brake-pressure control assembly.

German Patent Application No. DE 10 2016 202 113 A1 describes a narrow cuboidal hydraulic unit for a hydraulic assembly of a slip-controlled hydraulic power-brake system having three ports for a brake-fluid reservoir in an upper side of the hydraulic unit. Below the ports, a brake master-cylinder bore passes through the hydraulic unit in a direction parallel to the upper side continuously from one narrow side to an opposite narrow side adjoining the upper side. Below the brake master-cylinder bore, a power-cylinder bore passes through the hydraulic unit transversely to the brake master-cylinder bore from one large side to an opposite large side of the hydraulic unit, the large sides adjoining the upper side and the two narrow sides of the hydraulic unit. To generate a brake pressure by non-muscular energy, a power piston is displaceable in the power-cylinder bore by an electric motor via a ball-screw drive. The electric motor is disposed on the outside of the hydraulic unit, coaxially to the power-cylinder bore, and the ball-screw drive is located—likewise coaxially to the electric motor and the power-cylinder bore—between the electric motor and the power piston. The electric motor and the ball-screw drive form a power drive, and together with the power piston and the power-cylinder bore, form a power brake-pressure generator for the vehicle hydraulic brake system. Ports for the connection of hydraulic wheel brakes through brake lines are placed close to the upper side at the level of the ports for the brake-fluid reservoir in one of the two large sides of the hydraulic unit.

SUMMARY

A hydraulic unit of an example embodiment of the present invention is provided for a service brake assembly of a hydraulic power-brake system having a brake-pressure control. Brake-pressure control means the generation and control of a brake pressure in the vehicle brake system, in brake circuits of the vehicle brake system and/or in hydraulic wheel brakes of the vehicle brake system that are connected to the hydraulic unit. In particular, the brake-pressure control may also include a slip control. For example, slip controls are antilock braking systems, traction control systems and/or vehicle dynamics controls, for which the abbreviations ABS, TCS and/or VDC are customary. Slip controls are familiar and are not explained here.

The hydraulic unit is used for the mechanical securing and hydraulic interconnection of hydraulic components of the vehicle brake system, the brake-pressure generation and/or the brake-pressure control and/or the slip control. Such hydraulic components are solenoid valves, non-return valves, hydraulic accumulators, damping chambers and pressure sensors, among others. The hydraulic components are secured in mountings in the hydraulic unit, which usually take the form of cylindrical hollows, blind holes or through-holes, in part with steppings in diameter. "Interconnected" means that the mountings, or rather the hydraulic components secured in them, are connected by lines in the hydraulic unit according to a hydraulic circuit diagram of the vehicle brake system. Typically, the lines are not necessarily drilled in the hydraulic unit, however.

The hydraulic unit, fitted with the hydraulic components of the vehicle brake system and/or its slip control, forms the service brake assembly, "fitted" meaning that the hydraulic components are fixed in the mountings of the hydraulic unit provided in each case for them.

In addition, the hydraulic unit especially has ports for brake lines which lead to hydraulic wheel brakes of the vehicle brake system.

For autonomous driving up to levels 4 and 5, an example embodiment of the present invention provides a connection of a secondary brake assembly to the service brake assembly. Level 4 is also referred to as highly automated driving and means that the guidance of a vehicle is taken over long-term by an electronic system, and a driver is requested to intervene only when the system is no longer handling the driving tasks. Level 5 is also referred to as full automation and requires no driver. For this purpose, the hydraulic unit of the service brake assembly has ports for brake lines leading to and coming from the secondary brake assembly. The secondary brake assembly has a power brake-pressure generator to generate a hydraulic brake pressure in the event the power brake-pressure generator of the service brake assembly fails. The present invention is also usable for autonomous driving with lower levels and for non-autonomous driving.

The present invention is directed particularly to a drilling of the hydraulic unit of the service brake assembly. By "drilling" is meant the arrangement of the mountings for the hydraulic components and the ports for the brake lines leading to the secondary brake assembly and the wheel brakes, as well as the lines connecting the mountings and ports in the hydraulic unit.

The hydraulic unit of the present invention has an upper side which is intended for mounting a brake-fluid reservoir. In the upper side, the hydraulic unit has one or more ports for the brake-fluid reservoir.

An attachment side of the hydraulic unit adjoining the upper side of the hydraulic unit is designed to secure the hydraulic unit or rather the service brake assembly, that is, the hydraulic unit fitted with the hydraulic components of the vehicle brake system, to a firewall of a motor vehicle. For this purpose, on the attachment side, the hydraulic unit has two standardized internal threaded holes, for example, into which stud bolts or stay bolts are able to be screwed to secure the hydraulic unit, that is, the service brake assembly, to the firewall of the motor vehicle. A brake master-cylinder bore opens out on the attachment side of the hydraulic unit, so that a brake master-cylinder piston is displaceable in the brake master-cylinder bore by muscular energy via a brake pedal, mounted opposite the hydraulic unit on the firewall of the motor vehicle, by way of a pedal rod which connects the brake pedal in articulated fashion to the brake master-cylinder piston.

A power-cylinder bore for generating a brake pressure by non-muscular energy is placed in the hydraulic unit transversely to the brake master-cylinder bore and below the brake master-cylinder bore, that is, on a side of the brake master-cylinder bore facing away from the upper side of the hydraulic unit.

The brake master-cylinder bore is thus located between the power-cylinder bore and the upper side of the hydraulic unit, and the power-cylinder bore is located between the brake master-cylinder bore and a bottom side of the hydraulic unit opposite the upper side.

A port for the secondary brake assembly is disposed on or in the motor side close to the upper side of the hydraulic unit of the service brake assembly. "Close to" means a distance of preferably no more than a diameter of the port for the secondary brake assembly or for the brake-fluid reservoir. To hydraulically connect the port for the secondary brake assembly to the brake-fluid reservoir, an example embodiment of the present invention provides a first feed line in the hydraulic unit, which runs from a first port for the brake-fluid reservoir on or in the upper side of the hydraulic unit in the direction of the brake master-cylinder bore, and after angling, runs parallel to the brake master-cylinder bore between the brake master-cylinder bore and the upper side of the hydraulic unit to a pressure line which connects the first port for the secondary brake assembly to the brake master-cylinder bore.

Alternatively, it is also possible for the feed line to lead from the first port for the brake-fluid reservoir directly into the brake master-cylinder bore and be connected by the brake master-cylinder bore to the pressure line, which leads to the port for the secondary brake assembly.

The drilling of the hydraulic unit of the service brake assembly according to the present invention makes it possible to connect the secondary brake assembly to the brake-fluid reservoir with a low flow resistance.

According to one refinement of the present invention, a non-return valve traversable in the direction of the secondary brake assembly may be accommodated in space-saving fashion in a mounting in extension of the first port for the brake-fluid reservoir.

Through-holes or blind holes in the hydraulic unit referred to here as "lines" or "bores" or as "cylinder bores" may also be produced in a manner other than by drilling.

Further developments and advantageous refinements of the present invention are disclosed herein.

All features disclosed in the specification and in the figures may be realized individually or in basically any combination in specific embodiments of the present invention. Realizations of the present invention which do not have all, but rather only one or more features of a specific embodiment of the present invention, are possible.

BRIEF DESCRIPTION OF THE DRAWINGS

The present invention is explained in greater detail below on the basis of a specific embodiment shown in the figures.

The figures are somewhat simplified representations.

DETAILED DESCRIPTION OF EXAMPLE EMBODIMENTS

Figure 1:
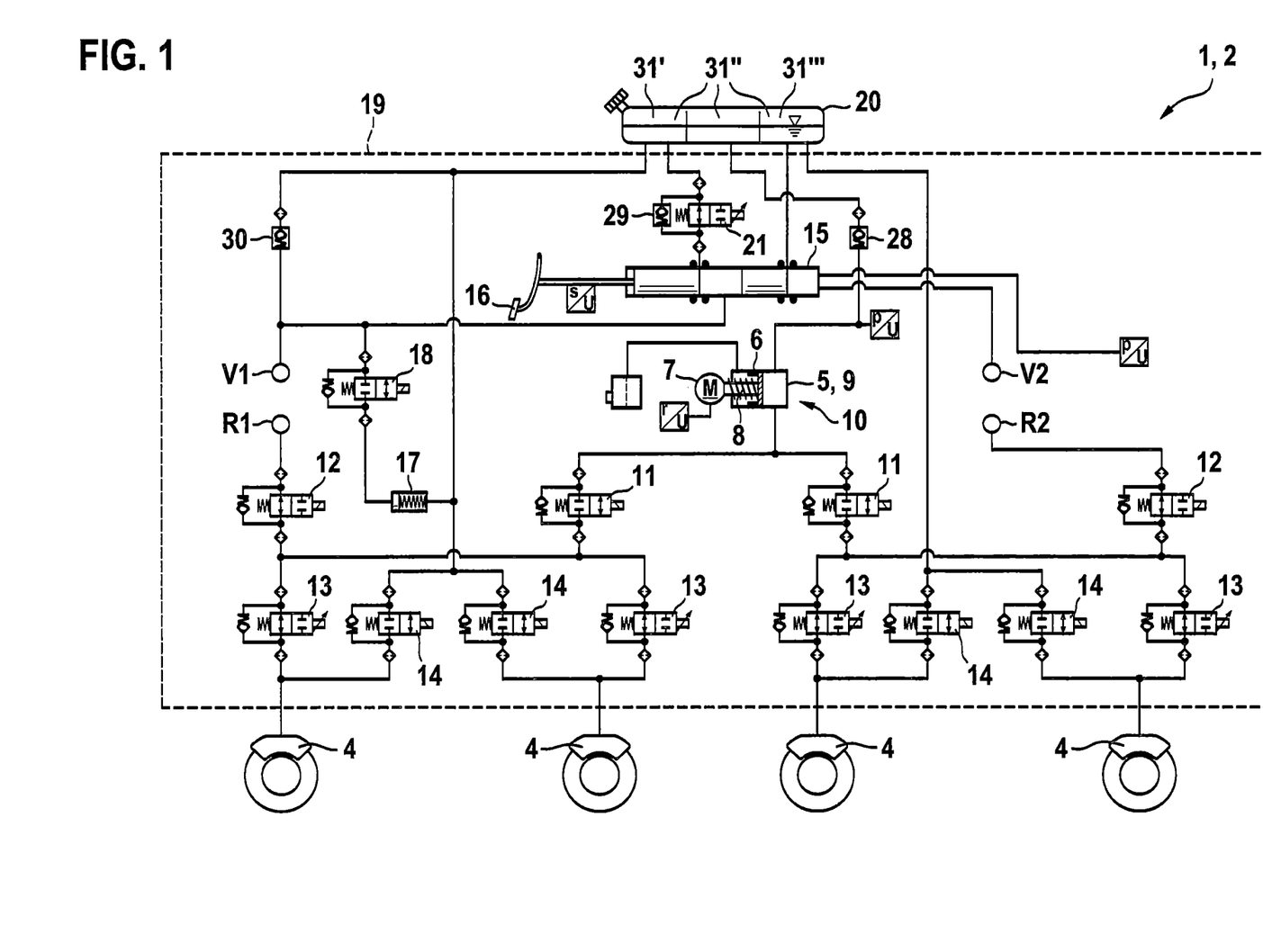
FIG. 1 shows a hydraulic circuit diagram of a service brake assembly of an electrohydraulic power-brake system according to an example embodiment of the present invention.
Figure 2:
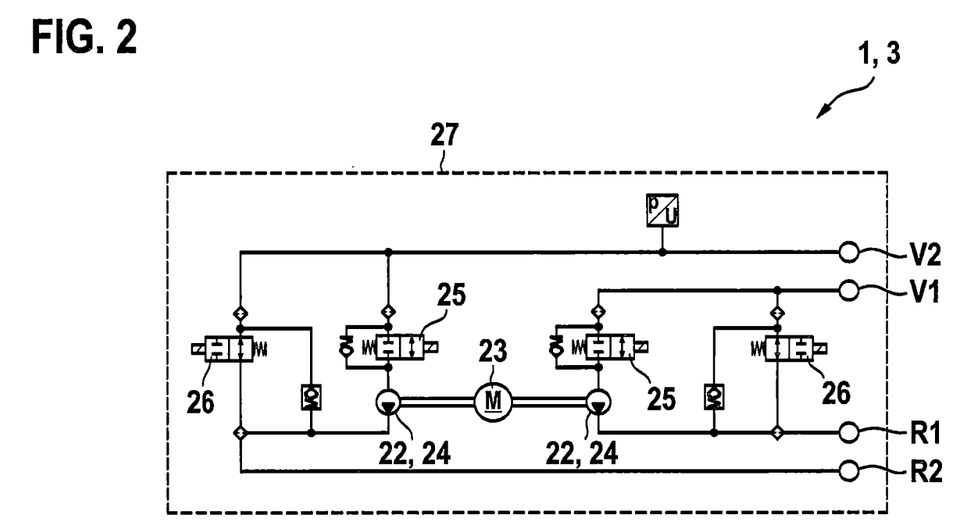
FIG. 2 shows a hydraulic circuit diagram of a secondary brake assembly of the electrohydraulic power-brake system from FIG. 1.

Electrohydraulic power-brake system 1 according to the present invention, shown in FIGS. 1 and 2, is provided for a passenger car driving autonomously up to level 4 or 5. Level 4 denotes autonomous driving during which a driver may be requested to intervene, and level 5, the highest level, denotes autonomous driving that requires no input by the driver.

Power-brake system 1 has a service brake assembly 2 and a secondary brake assembly 3. Service brake assembly 2 is intended to actuate the brakes, and secondary brake assembly 3 is provided to actuate the brakes in the event of a failure or breakdown of service brake assembly 2. Hydraulic wheel brakes 4 are connected via brake lines—four in the exemplary embodiment—to service brake assembly 2. Secondary brake assembly 3 is connected via brake lines to service brake assembly 2 in such a way that wheel brakes 4 are also able to be actuated by secondary brake assembly 3. Service brake assembly 2 and secondary brake assembly 3 are each a separate assembly, service brake assembly 2 being secured to a firewall of the passenger car, while in principle, secondary brake assembly 3 may be disposed at any location in the passenger car as desired. The brake lines which connect secondary brake assembly 3 to service brake assembly 2 are also denoted hereinafter as feed lines V1, V2 and as return lines R1, R2.

Vehicle brake system 1 according to the present invention takes the form of a dual-circuit brake system and its brake assemblies 2, 3 are implemented as dual-circuit brake assemblies. In each case two wheel brakes 4 are assigned to one brake circuit. Secondary brake assembly 3 is connected in each brake circuit to service brake assembly 2 by one feed line V1, V2 and by one return line R1, R2. Connection points of feed lines V1, V2 and of return lines R1, R2 are denoted correspondingly by V1, V2, R1 and R2 in service brake assembly 2 and in secondary brake assembly 3.

Service brake assembly 2 has a piston-cylinder unit 5 whose piston 6 is displaceable in a cylinder 9 by an electric motor 7 via a screw drive 8 as rotation/translation transformation gear. Electric motor 7, screw drive 8 and piston-cylinder unit 5 form a power brake-pressure generator 10 of service brake assembly 2 to generate brake pressure for a service brake application. The service brake application is the customary and intended brake actuation.

Power brake-pressure generator 10 is connected to the two brake circuits of power-brake system 1 via service-brake valves 11 between isolating valves 12 and inlet valves 13.

For each wheel brake 4, service brake assembly 2 has one inlet valve 13 and one outlet valve 14, by which wheel-brake pressures are controllable individually in each wheel brake 4. As a result, the wheel-brake pressures in wheel brakes 4 and thus braking forces of wheel brakes 4 are controllable without slippage during normal vehicle operation. In addition, slip controls such as antilock braking systems and traction control systems, vehicle dynamics controls, which are also commonly referred to as wheel-slip controls, automatic brakings, distance controls and the like are more practicable. Such controls are familiar and are not explained in greater detail here. Inlet valves 13 and outlet valves 14 may also be possible as wheel-brake pressure-control valve assemblies 13, 14.

Besides power brake-pressure generator 10, service brake assembly 2 has a brake master cylinder 15 operable by muscular energy, to which wheel brakes 4 are connected via isolating valves 12 and inlet valves 13. Service brake assembly 2 has one isolating valve 12 in each brake circuit, and one inlet valve 13 and one outlet valve 14 for each wheel brake 4. Brake master cylinder 15 is used as setpoint generator for the wheel-brake pressures to be set in wheel brakes 4 in response to a service braking in the event a driver is operating the vehicle. The brake pressure is generated by power brake-pressure generator 10 both during operation by the driver and during autonomous driving. In the case of a service braking, brake master cylinder 15 is disconnected hydraulically from wheel brakes 4 by the closure of isolating valves 12.

As said, brake master cylinder 15 is used as setpoint generator for the wheel-brake pressures in the case of a service braking during driver operation, in which the brake pressure is generated by power brake-pressure generator 10 of service brake assembly 2. In the event power brake-pressure generator 10 fails, the brake pressure may be generated by actuation of brake master cylinder 15. This is what is referred to as secondary braking with muscular energy, and therefore brake master cylinder 15 may also be possible as a muscular-energy brake-pressure generator.

In order that brake fluid is able to be displaced out of brake master cylinder 15 when isolating valves 12 are closed, and that the piston of brake master cylinder 15 and a brake pedal 16 are able to be moved, service brake assembly 2 has a pedal-travel simulator 17 that is connected via a simulator valve 18 to a brake circuit of brake master cylinder 15. Pedal-travel simulator 17 is a piston-cylinder unit having a piston that is spring-loaded or is also acted upon by gas pressure, for example.

In the specific embodiment of the present invention described and illustrated, isolating valves 12 and inlet valves 13 are 2/2-way solenoid valves that are open in their currentless home positions, and service-brake valves 11 of power brake-pressure generator 10, outlet valves 14 and simulator valve 18 are 2/2-way solenoid valves that are closed in their currentless home positions.

The hydraulic components of service brake assembly 2 of electrohydraulic power-brake system 1 according to the present invention, namely, valves 11, 12, 13, 14, 18, power brake-pressure generator 10, brake master cylinder 15, pedal-travel simulator 17 and further components such as pressure sensors are disposed in mountings in a hydraulic unit 19 of service brake assembly 2 and are interconnected by a drilling of hydraulic unit 19 corresponding to the drawn hydraulic circuit diagram of vehicle brake system 1 or of service brake assembly 2

An unpressurized brake-fluid reservoir 20 as used for conventional brake master cylinders is mounted on hydraulic unit 19, and brake master cylinder 15 and power brake-pressure generator 10 are connected to it by way of a non-return valve 28. In one of the two brake circuits, a test valve 21 is provided between brake-fluid reservoir 20 and brake master cylinder 15. Test valve 21 in the exemplary embodiment is likewise a 2/2-way solenoid valve that is open in its currentless home position. Parallel-connected hydraulically to test valve 21 is a non-return valve 29, traversable in the direction of brake master cylinder 15, which is not provided in all implementations of the present invention, however.

In each of its two brake circuits, secondary brake assembly 3 has a hydraulic pump 22, which are able to be driven by one shared electric motor 23. Hydraulic pumps 22 are piston pumps, with other hydraulic pumps, e.g., gear pumps, likewise being possible. Hydraulic pumps 22, together with electric motor 23, form power brake-pressure generator 24 of secondary brake assembly 3.

Suction sides of hydraulic pumps 22 of secondary brake assembly 3 are connected to the two brake circuits of brake master cylinder 15 of service brake assembly 2 via suction valves 25 and the brake lines already indicated, namely, feed lines V1, V2, by which secondary brake assembly 3 is connected to service brake assembly 2. Pressure sides of hydraulic pumps 22 of secondary brake assembly 3 are connected via pressure valves 26 and feed lines V1, V2 to the two brake circuits of brake master cylinder 15 of service brake assembly 2. In addition, the pressure sides of hydraulic pumps 22 of secondary brake assembly 3 are connected to isolating valves 12 of service brake assembly 2 via brake lines, namely, return lines R1, R2, by which secondary brake assembly 3 is connected to service brake assembly 2. In this way, actuation of wheel brakes 4 through the generation of brake pressure by hydraulic pumps 22 of secondary brake assembly 3, which form its power brake-pressure generator 24, is possible. Wheel-brake pressures in wheel brakes 4 are controllable by inlet valves 13 and outlet valves 14 of service brake assembly 2, which form the wheel-brake pressure-control valve assemblies, insofar as these valves 13, 14 and their controls are functional. In the event of a fault or a failure of service brake assembly 2, the brake pressure is generated by hydraulic pumps 22 of secondary brake assembly 3 forming power brake-pressure generator 24. Such a braking is referred to as secondary braking.

In the specific embodiment of the present invention described and illustrated, suction valves 25 of secondary brake assembly 3 are implemented as 2/2-way solenoid valves that are closed in their currentless home positions, and pressure valves 26 are implemented as 2/2-way solenoid valves that are open in their currentless home positions. During a secondary braking, suction valves 25 are opened, so that hydraulic pumps 22 of secondary brake assembly 3 are able to suck brake fluid through brake master cylinder 15 out of brake-fluid reservoir 20 of service brake assembly 2. In addition, pressure valves 26 are closed, in order to apply a brake pressure to wheel brakes 4.

During a service brake application, owing to open pressure valves 26 of secondary brake assembly 3 and service-brake valves 11 of service brake assembly 2 to be opened in this case, a brake pressure generated by power brake-pressure generator 10 of service brake assembly 2 is applied to wheel brakes 4, or owing to open pressure valves 26 of secondary brake assembly 3 and owing to open isolating valves 12 of service brake assembly 2, a brake pressure generated by power brake-pressure generator 10 is applied to wheel brakes 4.

For a rapid buildup of brake pressure in the case of a secondary braking, in one brake circuit, hydraulic pump 22 of power brake-pressure generator 24 of secondary brake assembly 3 is connected by way of a non-return valve 30 to brake-fluid reservoir 20 of service brake assembly 2. In the exemplary embodiment, non-return valve 30 is disposed in hydraulic unit 19 of service brake assembly 2. Preferably, the hydraulic pump 22 of a primary circuit is connected by way of non-return valve 30 to brake-fluid reservoir 20, but the connection of the hydraulic pump 22 of a secondary circuit to brake-fluid reservoir 20 by way of a non-return valve 30 or both brake circuits by way of one non-return valve 30 each (not shown) is also possible. The primary circuit is the brake circuit which is actuated directly by brake pedal 16 via a pedal rod.

The hydraulic components of secondary brake assembly 3, namely, hydraulic pumps 22, valves 25, 26 and further components such as pressure sensors are disposed in a hydraulic unit 27 of secondary brake assembly 3 and are connected to each other by drilling hydraulic unit 27 according to the hydraulic circuit diagram drawn, which may also be referred to as interconnection of hydraulic components 22, 25, 26.

Brake-fluid reservoir 20 has one chamber 31', 31''' for each brake circuit, and additionally one chamber 31'' for power brake-pressure generator 10 of service brake assembly 2, thus, a total of three chambers 31', 31'', 31'''. Non-return valve 30, through which one hydraulic pump 22 of secondary brake assembly 3 is connected to brake-fluid reservoir 20, is connected to the same chamber 31' of brake-fluid reservoir 20 as test valve 21. Hydraulic pumps 22 of secondary brake assembly 3 are connected to different chambers 31', 31''' of brake-fluid reservoir 20. Power brake-pressure generator 10 of service brake assembly 2 is connected to its own chamber 31'', that is, to a different chamber 31'' of brake-fluid reservoir 20 than hydraulic pumps 22 of secondary brake assembly 3.

Hydraulic unit 19 of service brake assembly 2 is drilled according to the hydraulic circuit diagram shown in FIG. 1. By "drilled" or "drilling" are meant the cylinder bores placed in hydraulic unit 19, mountings for the solenoid valves and connecting bores as well as the lines connecting them according to the hydraulic circuit diagram. Hydraulic unit 19 is drilled in Cartesian fashion, that is, the bores, mountings, connections, lines, etc. are placed in hydraulic unit 19 so that they are parallel and perpendicular to each other and to sides and edges of hydraulic unit 19. That does not rule out individual, obliquely-running lines and bores.

Figure 3:
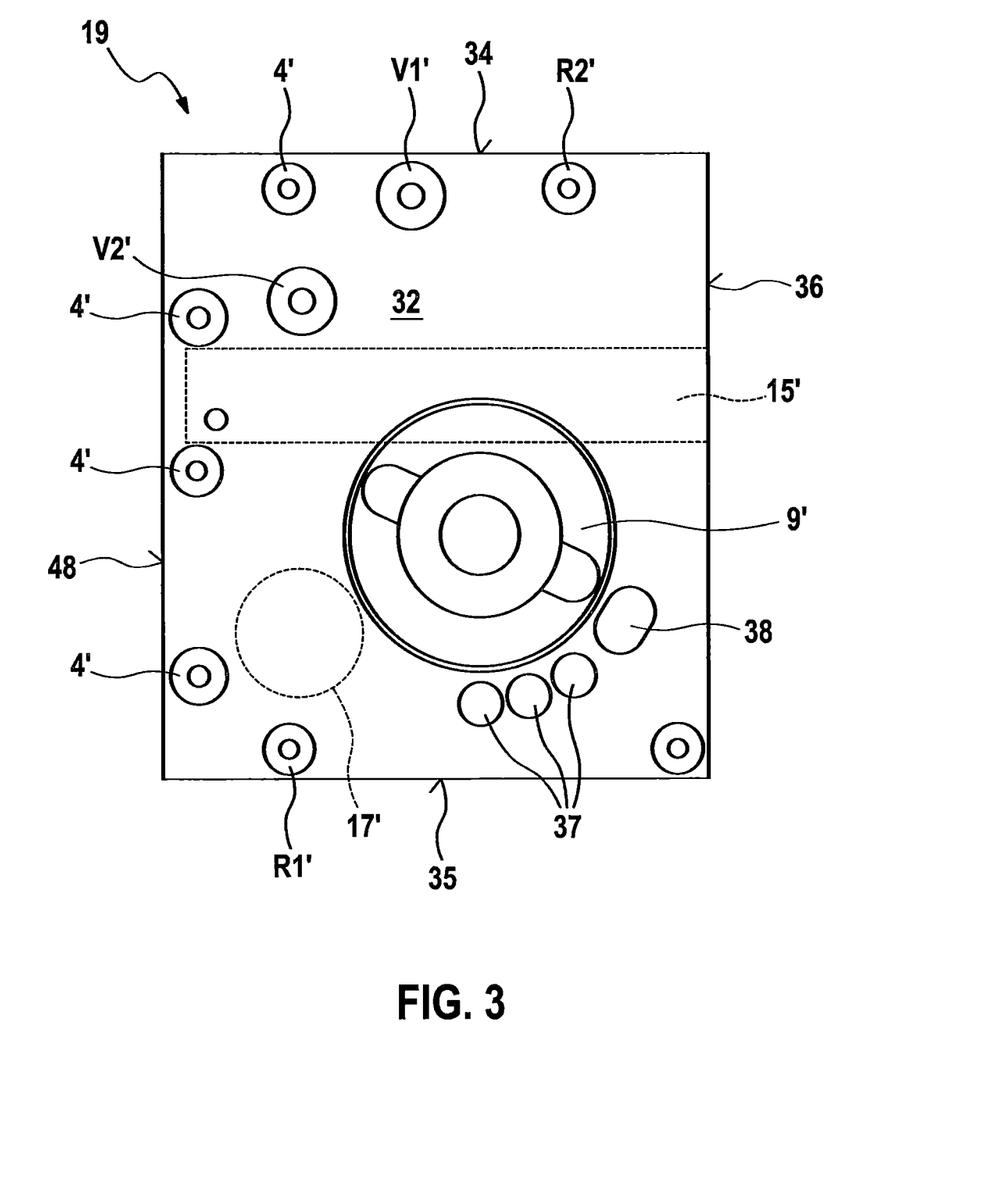
FIG. 3 shows a view of a motor side of a hydraulic unit of the service brake assembly of the vehicle brake system of the example embodiment of the present invention according to FIG. 1.
Figure 4:
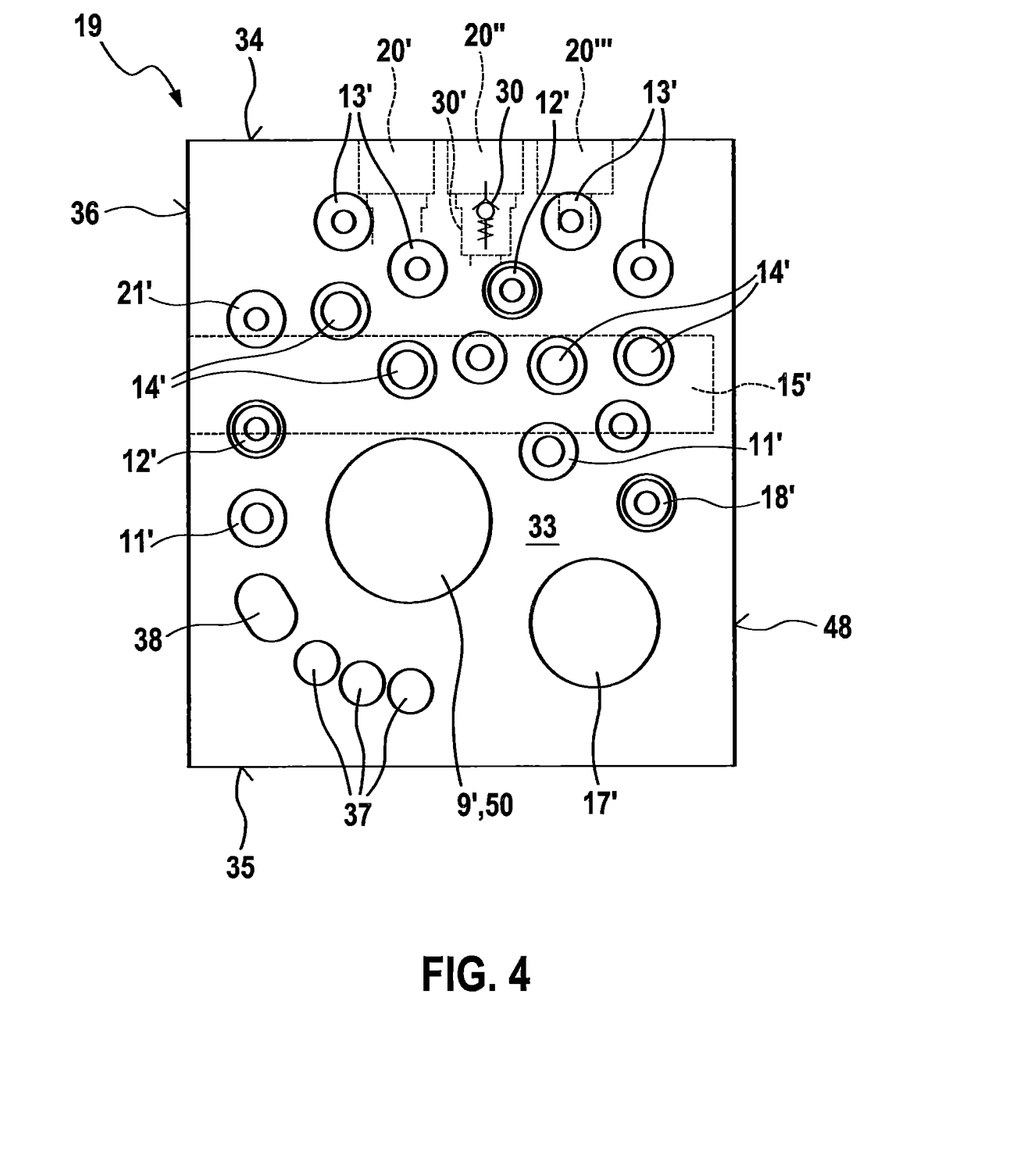
FIG. 4 shows a view of a valve side of the hydraulic unit from FIG. 3 opposite the motor side.

FIG. 3 shows a motor side 32 and FIG. 4 shows an opposite valve side 33 of hydraulic unit 19 of service brake assembly 2. Hydraulic unit 19 in the exemplary embodiment is a flat, cuboidal metal block which is used for the mechanical securing and hydraulic interconnection of the hydraulic components of vehicle brake system 1. When populated with the hydraulic components, hydraulic unit 19 forms service brake assembly 2 of vehicle brake system 1. "Flat" means that hydraulic unit 19 is approximately three to four times as wide or long as thick. Two opposite large sides of hydraulic unit 19 are nearly square in the exemplary embodiment and form motor side 32 and valve side 33. Hydraulic unit 19 is shown unpopulated in FIGS. 3 and 4, that is, without the hydraulic components.

A brake master-cylinder bore 15', which forms brake master cylinder 15, is placed in hydraulic unit 19 parallel to an upper side 34 and in a middle between motor side 32 and valve side 33. Brake master-cylinder bore 15' is represented with dashed lines in FIGS. 3 and 4. In the exemplary embodiment, it is located somewhat above a center of hydraulic unit 19 between upper side 34 and an opposite bottom side 35 of hydraulic unit 19, so that brake master-cylinder bore 15' abuts approximately tangentially against a side of a center plane of hydraulic unit 19 facing upper side 34, between upper side 34 and bottom side 35.

A power-cylinder bore 9', which forms cylinder 9 of power brake-pressure generator 10, is placed perpendicular to brake master-cylinder bore 15' in motor side 32 (FIG. 3) of hydraulic unit 19, and projects as a sort of dome 50 on valve side 33 (FIG. 4). Power-cylinder bore 9' is located somewhat below brake master-cylinder bore 15', that is, between brake master-cylinder bore 15' and bottom side 35 of hydraulic unit 19. Power-cylinder bore 9' passes by brake master-cylinder bore 15' at a small distance. It is offset somewhat off-center in the direction of an attachment side 36 of hydraulic unit 19.

Electric motor 7 of power brake-pressure generator 10, which is not shown in FIG. 3, is disposed coaxially to power-cylinder bore 9' on the outside of motor side 32 of hydraulic unit 19. A planetary gear as reduction gear and screw drive 8, which is a ball-screw drive in the exemplary embodiment, are disposed coaxially to power-cylinder bore 9' between electric motor 7 and piston 6 of power brake-pressure generator 10 (not shown in FIG. 3).

Attachment side 36 is a narrow side of hydraulic unit 19, at which brake master-cylinder bore 15' is open. Attachment side 36 adjoins upper side 34, bottom side 35, motor side 32 and valve side 33, and is provided to attach hydraulic unit 19 to a firewall (not shown) of a motor vehicle. Hydraulic unit 19 is secured to the firewall of the motor vehicle in such a way that upper side 34 with brake-fluid reservoir 20 is located at the top. Brake master-cylinder bore 15' is open on attachment side 36 of hydraulic unit 19, so that a brake master-cylinder piston is displaceable in brake master-cylinder bore 15' with the aid of a foot-brake pedal, that is secured to an opposite side of the firewall, via a pedal rod which connects the brake master-cylinder piston to the foot-brake pedal in articulated fashion.

Secondary brake assembly 3 is connected by four brake lines, the two feed lines V1, V2 and the two return lines R1, R2, to hydraulic unit 19 of service brake assembly 2, and the four wheel brakes 4 are likewise connected by brake lines to hydraulic unit 19 of service brake assembly 2. For the connection, hydraulic unit 19 has blind holes that are denoted here as ports V1', V2', R1', R2', 4'. Ports V1', V2', R1', R2', 4' are placed in motor side 32 of hydraulic unit 19. Ports V1', V2', R1', R2', 4' are denoted by the reference numeral of the respective brake line, augmented by "'" their placement in motor side 32 of hydraulic unit 19 may be seen in FIG. 3. The brake lines are secured to ports V1', V2', R1', R2', 4' in pressure-tight fashion using press-in nipples (not shown) in what is referred to as self-clinch technique. It is also possible to connect the brake lines using threaded nipples, for example.

In valve side 33 (FIG. 4) of hydraulic unit 19, a cylinder bore 17' of pedal-travel simulator 17 is placed parallel to power-cylinder bore 9' and perpendicular to brake master-cylinder bore 15', its position being represented with dashed lines in FIG. 3. In the exemplary embodiment, cylinder bore 17' is located between brake master-cylinder bore 15' and bottom side 35 of hydraulic unit 19 and closer to bottom side 35 than to brake master-cylinder bore 15', and between power-cylinder bore 9' and a narrow side 48 of hydraulic unit 19 opposite attachment side 36.

In addition, mountings for solenoid valves 12, 13, 14, 18 of power-brake system 1 and mountings for further components of power-brake system 1 such as pressure sensors are placed in valve side 33 of hydraulic unit 19. The mountings, which are denoted in FIG. 4 by the reference numeral of the respective solenoid valve or other component with the addition of a "'", are cylindrical hollows or blind holes, partially stepped in diameter, in hydraulic unit 19. The hydraulic components are inserted into the mountings and caulked circumferentially in pressure-tight fashion. Of solenoid valves 12, 13, 14, 18, hydraulic sections forming the actual valves are situated in the mountings; armatures and solenoid coils, which are accommodated in valve domes, project from valve side 33 of hydraulic unit 19.

Placed in hydraulic unit 19 between power cylinder bore 9' and bottom side 35 are three through-holes, passing through from motor side 32 to valve side 33, as motor-connecting bores 37 for a power supply of electric motor 7 of power brake-pressure generator 10. Motor-connecting bores 37 are placed in hydraulic unit 19 on an imaginary arc around power-cylinder bore 9' between power-cylinder bore 9' and bottom side 35. Likewise placed in hydraulic unit 19 on the imaginary arc on which motor-connecting bores 37 are provided is a signal bore 38 for control lines and/or signal lines to or from electric motor 7.

In upper side 34, hydraulic unit 19 has three ports 20', 20", 20'" for the three chambers 31', 31", 31'" of brake-fluid reservoir 20, which are implemented as cylindrical blind holes in the exemplary embodiment. Upon mounting brake-fluid reservoir 20 on upper side 34 of hydraulic unit 19, connection fittings at the bottom of brake-fluid reservoir 20 enter, like in the case of a three-pin plug, into ports 20', 20", 20'" in upper side 34 of hydraulic unit 19, thereby connecting the three chambers 31', 31", 31'" of brake-fluid reservoir 20 to the brake circuits of power-brake system 1. To seal them, the connection fittings at the bottom of brake-fluid reservoir 20 have O-rings. Ports 20', 20", 20'" are disposed in a longitudinal direction of upper side 34 of hydraulic unit 19 one after the other in approximately a middle third of upper side 34. Viewed on valve side 33, ports 20', 20", 20'" are situated side by side. Viewed on upper side 34, ports 20', 20", 20'" have an offset relative to each other, a middle port 20" being situated closer to valve side 33, and the two outer ports 20', 20'" being situated closer to motor side 32.

Figure 5:
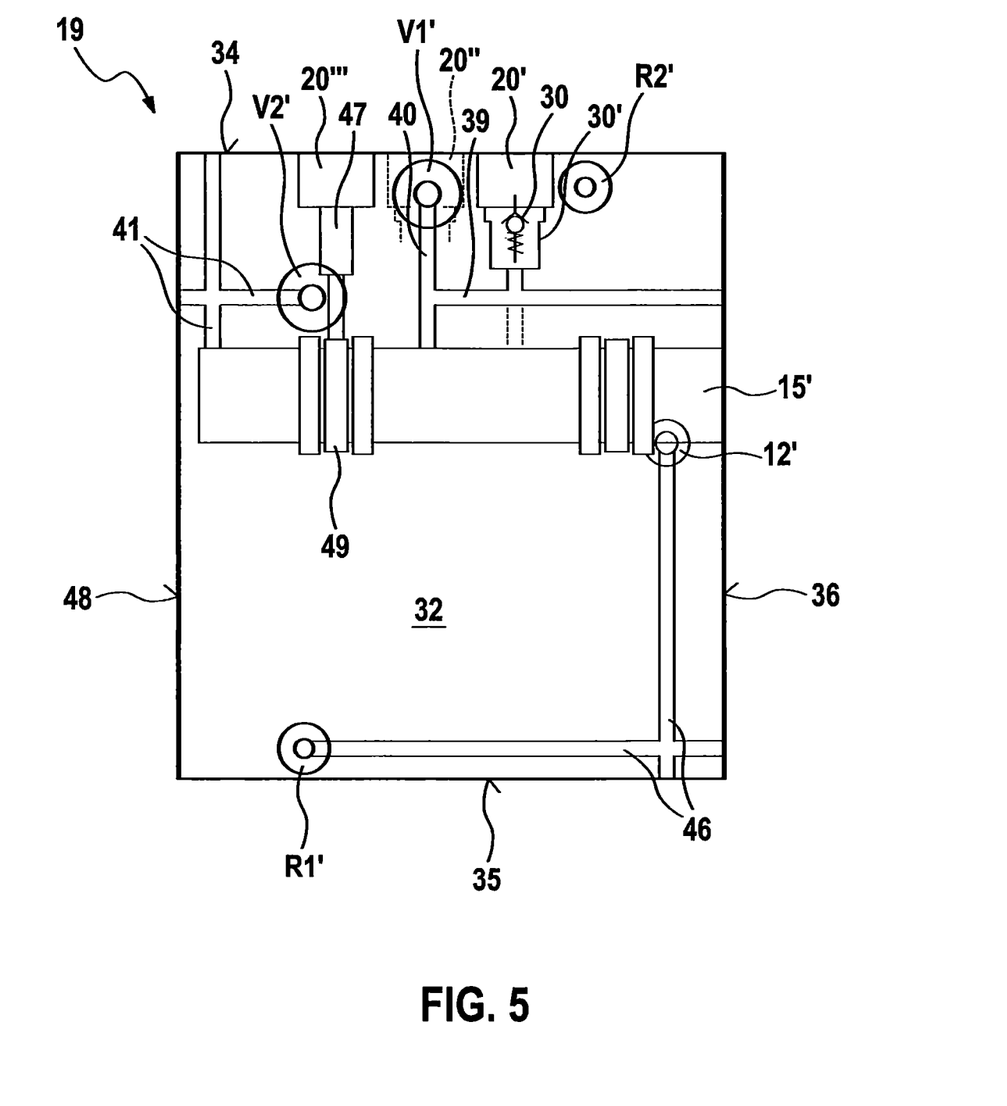
FIG. 5 shows the view of the motor side of the hydraulic unit according to FIG. 3, in which only a portion of the drilling is shown for a clearer depiction.
Figure 6:
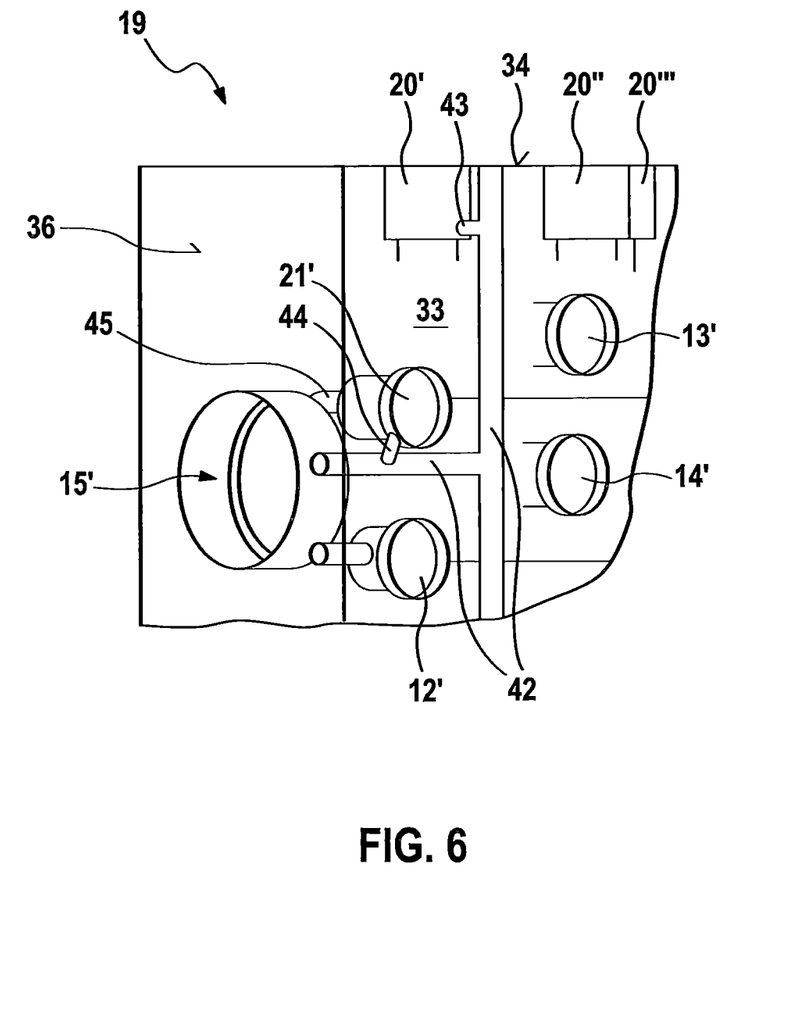
FIG. 6 shows a partial section of the hydraulic unit with an oblique view of an attachment side and the valve side.

In FIGS. 5 and 6, hydraulic unit 19 of service brake assembly 2 is drawn transparently in order to show its drilling. For a clearer representation, only a portion of the drilling is shown in FIGS. 5 and 6.

To connect one of the three chambers 31' of brake-fluid reservoir 20 hydraulically to one of the two feed lines V1' to hydraulic unit 27 of secondary brake assembly 3, a bore runs as first feed line 39 from a bottom of one of ports 20' in upper side 34 of hydraulic unit 19 of service brake assembly 2 in the direction of brake master-cylinder bore 15', and after angling, continues to run parallel to brake master-cylinder bore 15' in the direction of narrow side 48 of hydraulic unit 19 opposite attachment side 36, until first feed line 39 leads into a pressure line 40 that runs from port V1' for the feed to brake master-cylinder bore 15' (FIG. 5). First feed line 39 is installed in hydraulic unit 19 from attachment side 36 above brake master-cylinder bore 15'. In the exemplary embodiment, first feed line 39 is assigned to a primary circuit of power-brake system 1.

Alternatively, feed line 39 may lead from the bottom of port 20' for brake-fluid reservoir 20 directly downward into brake master-cylinder bore 15'. This alternative is represented with dashed lines in FIG. 5. In this case, the section of feed line 39 running parallel to brake master-cylinder bore 15' in hydraulic unit 19 is omitted.

At the bottom of port 20' of the one chamber 31' for brake-fluid reservoir 20, a hollow is provided in hydraulic unit 19 as mounting 30' for non-return valve 30 in feed V1 from brake-fluid reservoir 20 to one of the two hydraulic pumps 22 of secondary brake assembly 3. Non-return valve 30 is shown simplified in FIG. 5 as a circuit symbol.

A second feed line 41, which in the exemplary embodiment is assigned to a secondary circuit of power-brake system 1, runs, as may likewise be seen in FIG. 5, in hydraulic unit 19 of service brake assembly 2 from a closed end of brake master-cylinder bore 15', thus, close to narrow side 48 opposite attachment side 36, a short distance upward in the direction of upper side 34, and after angling, runs parallel to brake master-cylinder bore 15' in the direction of attachment side 36. After a further bend again upward, second feed line 41 leads at a bottom into port V2' of second feed V2.

To connect one of the three chambers 31' of brake-fluid reservoir 20 to brake master cylinder 15, a compensating line 42 in the form of a bore runs next to one of the three ports 20' for brake-fluid reservoir 20 from upper side 34 of hydraulic unit 19 downward, and after angling, runs at the level of brake-master cylinder bore 15' toward attachment side 36 (FIG. 6). Compensating line 42 is located close to valve side 33 between brake master-cylinder bore 15' and valve side 33. Compensating line 42 leads into port 20' for brake-fluid reservoir 20 with a short stub line 43 radial to port 20', and into mounting 21' for test valve 21 with an oblique line 44. The purpose of compensating line 42 is to compensate for temperature changes and brake-pad wear; when brake master cylinder 15 is not actuated, brake fluid is able to flow out of brake-fluid reservoir 20 through compensating line 42 into brake master cylinder 15 and vice versa.

A last section 45 of compensating line 42 runs from a bottom of mounting 21' for test valve 21 tangentially to brake master-cylinder bore 15'. Last section 45 of compensating line 42 intersects brake master-cylinder bore 15' tangentially at a peripheral location of brake master-cylinder bore 15' facing upper side 34 of hydraulic unit 19, so that brake master cylinder 15 is able to be bled.

A suction line 47 runs from a bottom of third port 20'" for brake-fluid reservoir 20 vertically downward to brake master-cylinder bore 15' and leads into a groove 49 encircling brake master-cylinder bore 15'.

Port R1' of one of the two returns R1 in motor side 32 of hydraulic unit 19 is connected to mounting 12' for one of the two isolating valves 12 in valve side 33 of hydraulic unit 19 by a second angled pressure line 46 that is placed in hydraulic unit 19 in a center plane in a center between motor side 32 and valve side 33 of hydraulic unit 19. Second pressure line 46 runs from port R1' of return R1 parallel to bottom side 35 in the direction of attachment side 36 and parallel to attachment side 36 upward to mounting 12' for isolating valve 12. Second pressure line 46 is shown in FIG. 5.

What is claimed is:

1. A hydraulic unit for a service brake assembly of a hydraulic power-brake system for an autonomously driving motor vehicle, comprising:
    an upper side which configured for mounting a brake-fluid reservoir and which has ports for the brake-fluid reservoir;
    an attachment side, which adjoins the upper side, configured to secure the hydraulic unit to a firewall of the motor vehicle and at which a brake master-cylinder bore opens out; and
    a motor side that adjoins the upper side and the attachment side and at which a power-cylinder bore opens out, the brake master-cylinder bore being located in the hydraulic unit between the power-cylinder bore and the upper side, and the motor side having a first port for a secondary brake assembly close to the upper side;
    wherein a first feed line in the hydraulic unit runs from a first port of the ports for the brake-fluid reservoir in a direction of the brake master-cylinder bore;
    wherein the first feed line runs from the first port for the brake-fluid reservoir in the direction of the brake master-cylinder bore, and after angling, runs between the brake master-cylinder bore and the upper side of the hydraulic unit to a first pressure line that connects the first port for the secondary brake assembly to the brake master-cylinder bore.

2. The hydraulic unit as recited in claim 1, wherein the first pressure line has a non-return valve traversable in a direction of the first port for the secondary brake assembly.

3. The hydraulic unit as recited in claim 2, wherein the hydraulic unit has a mounting for the non-return valve in extension of the first port for the brake-fluid reservoir.

4. A hydraulic unit for a service brake assembly of a hydraulic power-brake system for an autonomously driving motor vehicle, comprising:
    an upper side which configured for mounting a brake-fluid reservoir and which has ports for the brake-fluid reservoir;
    an attachment side, which adjoins the upper side, configured to secure the hydraulic unit to a firewall of the motor vehicle and at which a brake master-cylinder bore opens out; and
    a motor side that adjoins the upper side and the attachment side and at which a power-cylinder bore opens out, the brake master-cylinder bore being located in the hydraulic unit between the power-cylinder bore and the upper side, and the motor side having a first port for a secondary brake assembly close to the upper side;
    wherein a first feed line in the hydraulic unit runs from a first port of the ports for the brake-fluid reservoir in a direction of the brake master-cylinder bore;
    wherein the motor side has a second port for the secondary brake assembly between a second port of the ports for the brake-fluid reservoir and the brake master-cylinder bore, a suction line runs from a third port of the ports for the brake-fluid reservoir to the brake master-cylinder bore, and a second feed line runs from the brake master-cylinder bore in a direction of the upper side of the hydraulic unit, and after angling, runs to the second port for the secondary brake assembly.

5. The hydraulic unit as recited in claim 4, wherein the suction line leads into a groove encircling the brake master-cylinder bore.

6. A hydraulic unit for a service brake assembly of a hydraulic power-brake system for an autonomously driving motor vehicle, comprising:
    an upper side which configured for mounting a brake-fluid reservoir and which has ports for the brake-fluid reservoir;
    an attachment side, which adjoins the upper side, configured to secure the hydraulic unit to a firewall of the motor vehicle and at which a brake master-cylinder bore opens out; and
    a motor side that adjoins the upper side and the attachment side and at which a power-cylinder bore opens out, the brake master-cylinder bore being located in the hydraulic unit between the power-cylinder bore and the upper side, and the motor side having a first port for a secondary brake assembly close to the upper side;
    wherein a first feed line in the hydraulic unit runs from a first port of the ports for the brake-fluid reservoir in a direction of the brake master-cylinder bore;
    wherein the hydraulic unit has a mounting for a test valve in a valve side opposite the motor side, from which a line leads tangentially into the brake master-cylinder bore at a peripheral location facing the upper side, and a compensating line runs from the mounting for the test valve parallel to the brake master-cylinder bore, and after angling, runs in a direction of the upper side of the hydraulic unit, and after a further angling, leads into one of the ports for the brake-fluid reservoir.

* * * * *